US006752253B2

(12) United States Patent
Fiessler

(10) Patent No.: US 6,752,253 B2
(45) Date of Patent: Jun. 22, 2004

(54) GUARD MEANS FOR MACHINES, MORE PARTICULARLY PRESSBRAKES, GUILLOTINES, STAMPING MACHINES AND THE LIKE

(75) Inventor: Lutz Fiessler, Aichwald (DE)

(73) Assignee: Fiessler Elektronik oHG, Esslingen (DE)

( * ) Notice: Subject to any disclaimer, the term of this patent is extended or adjusted under 35 U.S.C. 154(b) by 114 days.

(21) Appl. No.: 10/144,696

(22) Filed: May 15, 2002

(65) Prior Publication Data

US 2002/0170401 A1 Nov. 21, 2002

(30) Foreign Application Priority Data

May 15, 2001 (DE) .......................................... 101 23 562

(51) Int. Cl.$^7$ ................................................. F16P 3/14
(52) U.S. Cl. .................. 192/130; 192/134; 192/129 A; 250/221
(58) Field of Search ............................. 192/130, 129 A, 192/133, 134; 250/221; 100/348

(56) References Cited

U.S. PATENT DOCUMENTS

| | | | | |
|---|---|---|---|---|
| 3,704,396 A | * | 11/1972 | Macdonald | 361/175 |
| 4,357,820 A | * | 11/1982 | Blanchard | 72/389.4 |
| 4,527,684 A | * | 7/1985 | Eggeman et al. | 192/130 |
| 6,316,763 B1 | * | 11/2001 | Appleyard et al. | 250/221 |
| 2002/0104958 A1 | * | 8/2002 | Fiessler | 250/221 |

* cited by examiner

Primary Examiner—Richard M. Lorence
(74) Attorney, Agent, or Firm—Browdy and Neimark, P.L.L.C.

(57) ABSTRACT

A guard device for machines such as pressbrakes, guillotines, stamping machines and the like, in the case of which a first machine part performs working movements toward a second machine part. At least one photoelectric detector, more especially a laser photoelectric detector, has its light beam extending perpendicularly to the direction of working movement and is able to be so positioned between the two machine parts at one thereof that its light beam is at a safety distance from such machine part, such safety distance being able to be set by means of a guard device arranged adjustably on this one machine part, such guard device bearing the at least one photoelectric detector. A halting mechanism is adapted to arrest the working movement on interruption of the light beam and a switching off mechanism serves for switching off the halting mechanism directly prior to interruption of the light beam. Furthermore there are mechanisms for the performance of a first movement of the guard device as far as interruption of the light beam by the machine part bearing the guard device and the performance of a second movement of the guard device in the opposite direction, the displacement or distance traveled, which sets the safety distance, in the second movement being able to be predetermined by an electrical measuring and/or control device. Accordingly for such adjustment no additional adjustment photoelectric detector is required and the adjustment may be performed in a simple manner by a single operator.

11 Claims, 4 Drawing Sheets

GUARD MEANS FOR MACHINES, MORE PARTICULARLY PRESSBRAKES, GUILLOTINES, STAMPING MACHINES AND THE LIKE

BACKGROUND OF THE INVENTION

The invention relates to a guard means for machines such as pressbrakes, guillotines, stamping machines and the like, in the case of which a first machine part performs working movements toward a second machine part, comprising at least one photoelectric detector, more especially a laser photoelectric detector, whose light beam extends perpendicularly to the direction of working movement and which is able to be so positioned between the two machine parts on one thereof that its light beam is at a safety distance from such machine part, such safety distance being able to be set by means of a guard means arranged adjustably on this one machine part, such guard means bearing the at least one photoelectric detector, a halting means adapted to arrest the working movement on interruption of the light beam and a switching off means for switching off the halting means directly prior to interruption of the light beam.

THE PRIOR ART

In the case of such a guard means disclosed in the German patent publication 19,717,299 A1 two photoelectric detectors or, respectively, two light beams are arranged one after the other in the direction of motion and the safety distance between them may be adjusted. For setting the distance the guard means is shifted toward this one machine part having the guard means, until the first light beam is interrupted by the machine part or, respectively, its tool. Then the safety distance is set. This arrangement however requires two photoelectric detectors or, respectively, light beams arranged one after the other in the direction of motion which constitute a substantial cost factor.

Although it is a known practice in an arrangement with a single photoelectric detector to apply a shim to manually set the distance from the one machine part or, respectively, its tool and to move until its light beam is interrupted by such shim, however for such adjustment two persons are required, more particularly in the case of extremely large machines, and the person holding the shim is exposed to substantial danger of injury by the tool.

SHORT SUMMARY OF THE INVENTION

Accordingly one object of the present invention is to provide a guard means of the initially described type with which there is no need for an additional adjustment photoelectric detector without this meaning that the safety distance of the guard means is not able to be set by a single operator or be set completely automatically.

In order to achieve these and/or other objects appearing from the present specification, claims and drawings, in the present invention means are provided for the performance of a first movement of the guard means as far as interruption of the light beam by the machine part bearing the guard means and the performance of a second movement of the guard means in the opposite direction, the displacement or distance traveled, which sets the safety distance, in the second movement being able to be predetermined by an electrical measuring and/or control means.

In accordance with an advantageous embodiment of the invention the safety distance is stored as the displacement of the second movement in the measuring and/or control means so that in a simple manner the guard means is moved in accordance with this electrically stored displacement in order to set the safety distance. There is no need for a second adjustment photoelectric detector and this means a substantial saving in costs. By presetting different stored values or by using calculated stored values it is possible for the safety distance to even be set in variable manner dependent on the respective requirements.

The measures indicated in the claims represent advantageous further developments and improvements in the guard means of the invention.

For the storage of the displacement setting or predetermining the safety distance the control means preferably comprises a data memory. For optimizing this data item it is an advantage to provide means for the automatic detection of overrun displacement of the moving machine part after a stop signal so that a value related to such overrun displacement predetermines the safety distance in the data memory. The safety distance may be so set in an optimum manner dependent on the respectively employed tool, the setup of the machine and other parameters such as service life, condition of the drive device and the brake device and the like.

In order to detect changes in condition it is useful to provide a comparison means for the comparison of the stored overrun displacement with a newly detected overrun displacement, means being provided for renewed automatic setting of the safety distance in a fashion dependent on the new overrun displacement, if a predeterminable departure between an earlier an a new overrun displacement is detected. The means for the automatic detection of the overrun displacement during the closing motion of the machine parts may preferably be activated after an interruption in the electrical power supply.

In order to improve safety several electrical control switches or wireless control elements, which are functionally connected with the moving guard means, may be provided, means also being provided for activating the closing movement of the machine parts only when a preselected control switch or a control element is reached. The same constitutes an additional safety measure in order to prevent a substantially too low setting of the safety distance in the case of there being an error in the automatic setting of the safety distance.

It is an advantage to provide an electric motor drive for causing, manually or completely automatically, the movement of the guard means during setting of the safety distance.

In order to increase the accuracy of adjustment the electrical measuring and/or control means comprises means for causing the setting of the displacement during the second movement only when interruption of the light beam has occurred, means being provided for activating the closing movement of the machine parts only on reaching a preselected control switch or control element.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
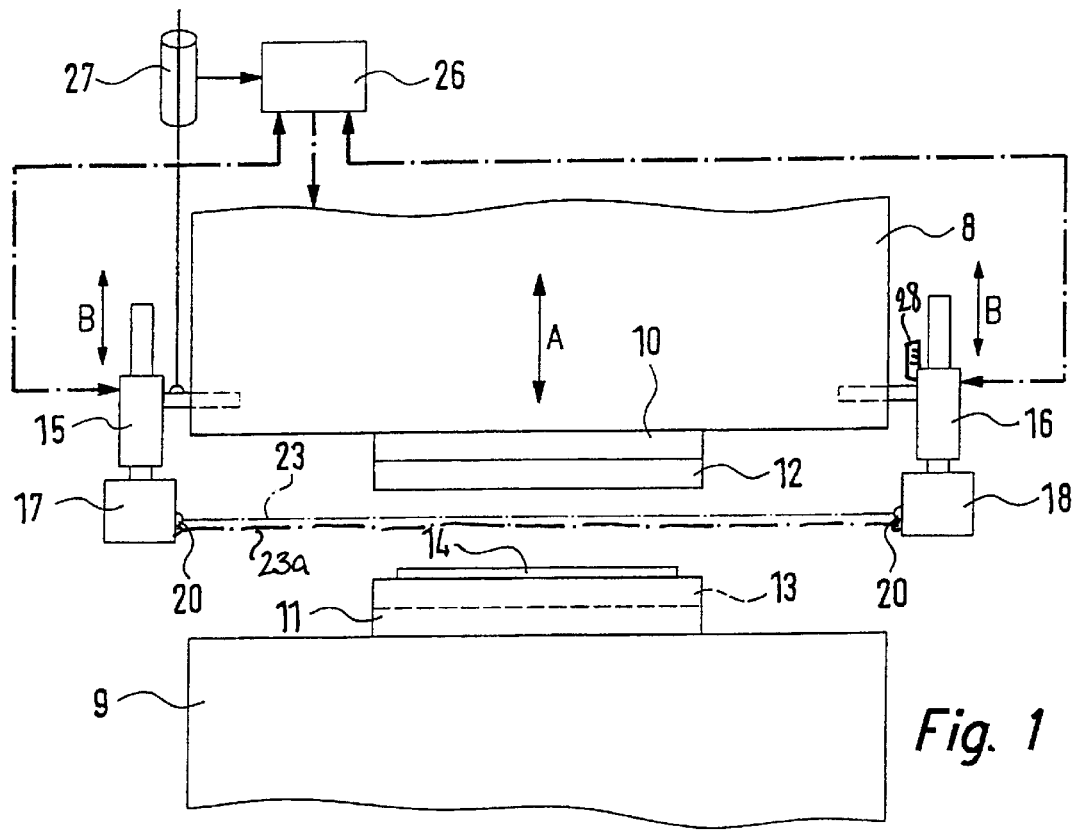
FIG. 1 is a longitudinal lateral elevation of a pressbrake provided with a guard means.
Figure 2:
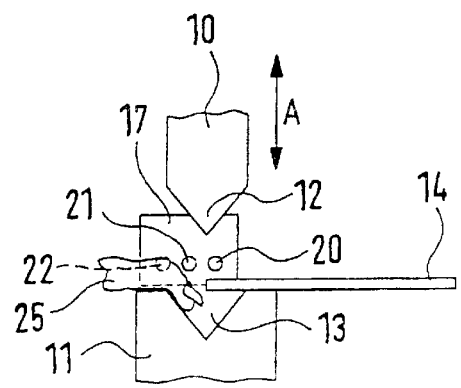
FIG. 2 is a transverse lateral elevation of the pressbrake illustrated in FIG. 1 with the top tool lowered.
Figure 3:
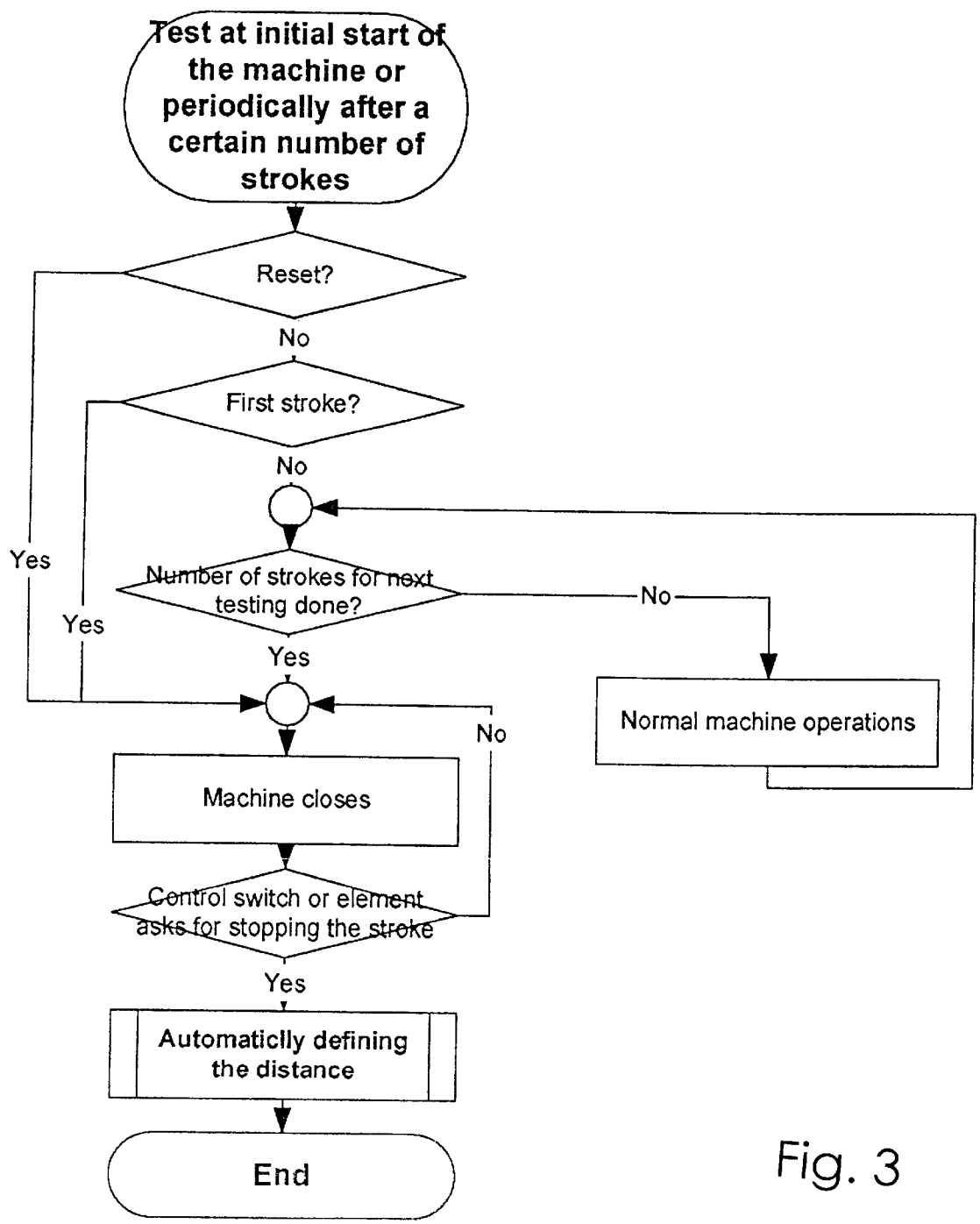
FIG. 3 is a flowchart of an embodiment of the present invention.
Figure 4:
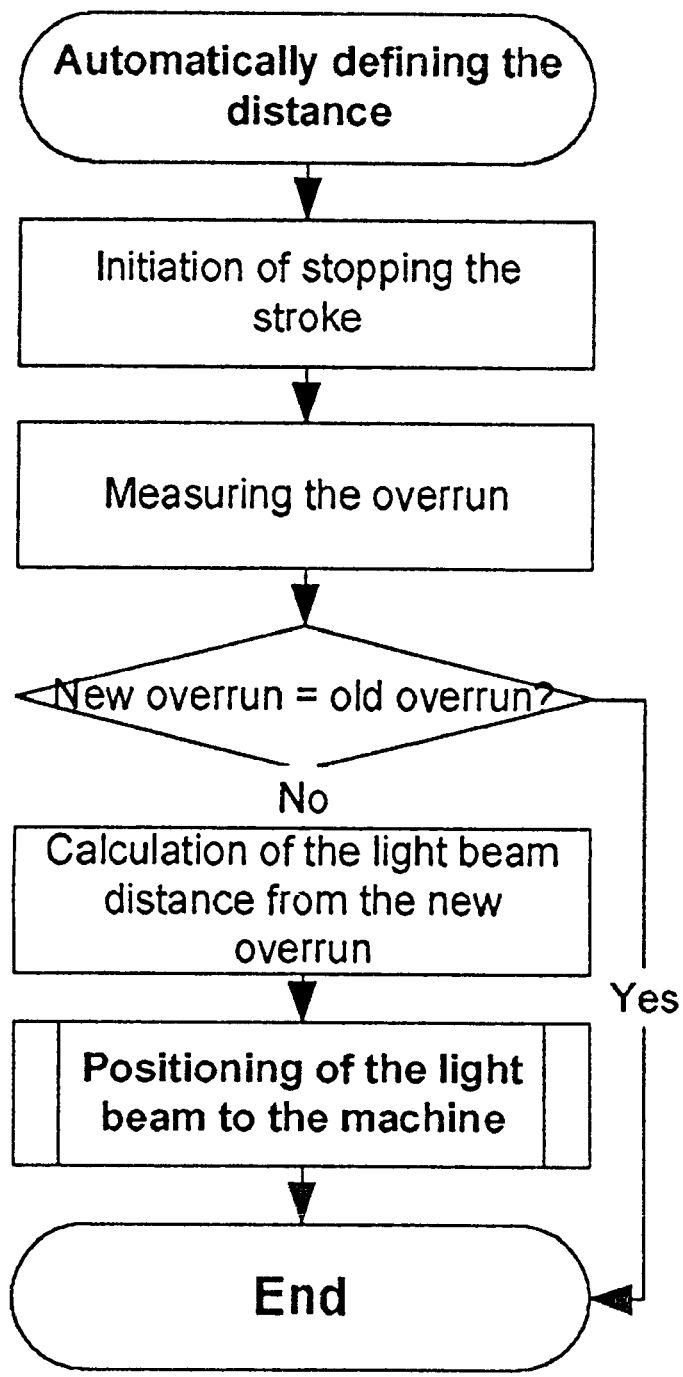
FIG. 4 is a flowchart of the method for automatically defining the safety distance according to an embodiment of the present invention.
Figure 5:
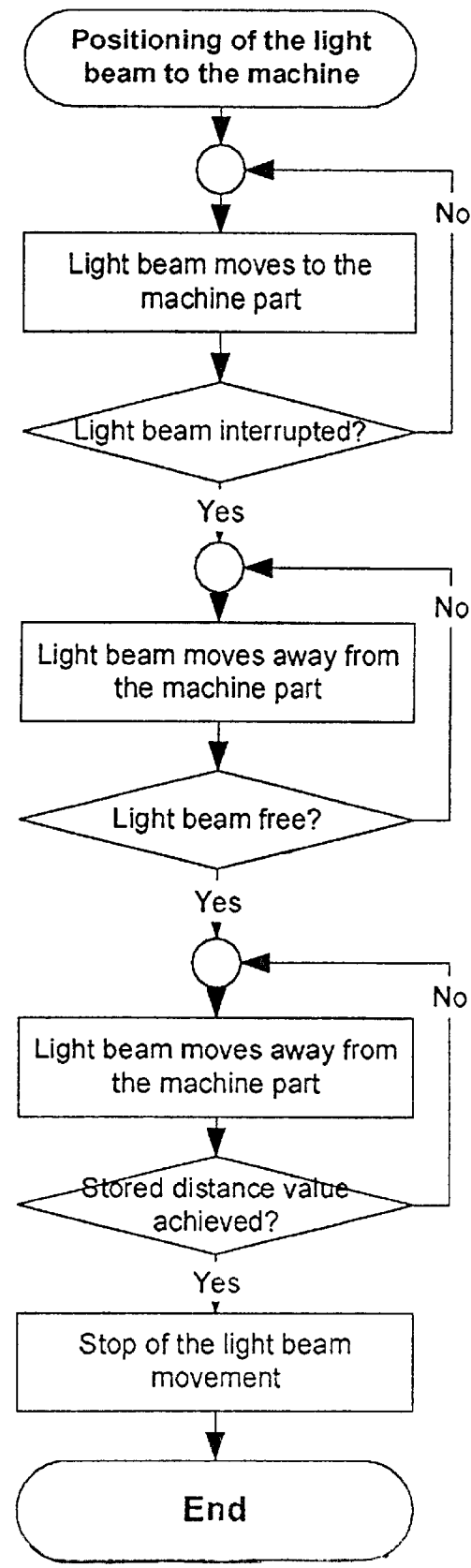
FIG. 5 is a flowchart of the method of positioning of the light beam to the machine according to an embodiment of the present invention.

The pressbrake depicted in FIGS. 1 and 2 essentially comprises a top machine part 8 provided with a top tool 10, which is able to be moved toward a stationary bottom machine part 9 provided with a bottom tool 11. The opposite direction A of working movement is indicated by a double arrow. It is naturally possible for the top tool 10 to be stationary and for the bottom tool 11 to be movable according to an alternative embodiment. The elongated top tool 10 possesses a working portion 12 with a wedge-like cross section, and the bottom tool 11 possesses a corresponding wedge-like groove 13 into which the working portion 12 fits during the working movement and accordingly bends or angles the sheet metal 14 to be worked resting on the bottom tool 11.

The remaining portions of the otherwise known pressbrake are omitted from the figure to render it more straightforward. The top tool 10 and the bottom tool 11 may obviously have different lengths and different cross sectional configurations and are each attached in a detachable manner to the top machine part 8 and, respectively, to the bottom machine part 9.

As a guard means guides 15 and 16 are attached, for instance by being screwed, to the oppositely placed narrow sides of the top machine part 8. In such guides 15 and 16 holders 17 and 18 for three photoelectric detectors 20 through 22 are able to be moved in a vertical direction of setting or adjustment, the direction of such adjustment being indicated by double arrows B, this corresponding to the direction A of working movement. For motor driven movement of the holders 17 and 18 motor drives such as electric motors, linear drives, drive cylinders or the like are provided to interlock on or in the guides 15 and 16. Each of the photoelectric detectors 20 through 22 consists in a known fashion of a light source, as for example a laser source, and a light receiver, as for instance a laser receiver, the laser source being arranged on the one holder 17 and the laser receiver being arranged on the other holder 18. It is in principle possible as well to virtually increase the number of the sources by using a beam spitter into a plurality of transmitted light beams. Furthermore it is possible for two parallel light beams (23, 23a) to be formed by parallel laser beams, which are produced by deflection using a reflection means. In the case of such a design the source and the receiver are for example arranged on the one holder 17 and the reflection means is arranged on the other holder 18.

The three photoelectric detectors 20 through 22 are all designed in the form of guard light photoelectric detectors and extend in a plane perpendicularly to the direction A of working movement. The number of such photoelectric detectors is obviously not limited, there being in the simplest case only one single photoelectric detector, as for example the photoelectric detector 20.

The protective or guard effect of the above described guard means is that the closing movement of the top tool 10 toward the bottom tool 11 is abruptly arrested, when one of the light beams from the 20 through 22 is interrupted, that is to say when an object is in the path of motion. Since such pressbrakes or the like are frequently hand operated there is more especially a danger of the operator's hand or arm getting into the path of movement and being crushed or even severed. The safety distance between the laser beams 23 of the photoelectric detectors 20 through 22, more particularly of the photoelectric detector 20, must hence be so dimensioned that for example no finger can be placed in between, while on the contrary the safety distance should be so large that on interruption of the laser beam 23 the closing movement is braked or arrested in good time short of the hindrance. The safety distance may consequently be between 3 and 10 mm, for example.

In the event of it being necessary to increase the safety distance, for example owing to a larger overrun displacement or braking distance of the top tool 10, in the case of a photoelectric detector 20 or, respectively, in the case of photoelectric detectors 20 through 22 in a plane spaced from the top tool there would be a danger of for instance a finger or entire limb, being inserted between the top tool 10 and this plane without the machine being arrested for safety reasons. In such a case the photoelectric detectors would be positioned in two or more planes following each other in the direction of the working movement, for instance in an L-like or T-like arrangement. The photoelectric detector 20 employed for setting the safety distance is in this case arranged in the space nearest to the top tool 10.

An electronic control means 26 serves for control of the movement of the top machine part 8 and for control of the movements of the holders 17 and 18 and accordingly of the photoelectric detectors 20 through 22 in the direction B of adjustment. A measurement module serves for detecting the motion of the top machine part 8 and accordingly of the top tool 10 and is for example in the form of an inductive or photo-optical displacement sensor, a linear potentiometer, a synchro or the like of known design.

The process of adjustment of the safety distance is so performed that responsive to a manual or automatic initiating signal in one direction the adjustment drive may be either timed or the drive comprises a displacement measuring means so that the position corresponding to the set value may serve as a basis for regulation. The adjustment of the safety distance starts either with the reversal of the adjustment drive or with the point in time, at which the interruption of the laser beam 23 ceases to have effect.

The adjustment process described for the safety distance may take place completely automatically or however in a simpler system be performed with manual control using suitable electrical control commands transmitted to the adjustment drive.

In order to increase safety, grid-like electrical control switches or contacts 28 or other wireless control elements may be provided on the guides 15 and 16, which in a manner dependent on the moving holders 17 and 18 are actuated or, respectively, activated. At the end of the adjustment process at least one particular switch must be actuated or activated in order to re-activate the rapid closing movement of the top tool 10 toward the bottom tool 11. Accordingly it is possible to prevent the setting of a substantially too small safety distance owing to some improper function.

The size of the safety distance is dependent substantially on the overrun displacement or braking distance of the top tool 10 following a stop or arrest command. This dependency may be taken into account by automatic linking of the stored setting value with the measured overrun displacement. For this purpose a measuring means for the overrun displacement is necessary, which is started manually or automatically in a way dependent on certain parameters such as time, electrical power reset or the like.

Using the module 27 it is possible from the respective position or, respectively, the travel of the top tool 10 to be transmitted to the control means 26. During a working movement of the top tool 10 in the downward direction for the measurement of overrun displacement the control means 26 sends a stop command to the drive device (not illustrated) from the top tool 10 or, respectively, the top machine part 8. At the point in time of the arrest command the measurement module 27 detects a first position signal and at the point in time of the actual halting of the top tool 10 a second position signal is detected. By forming the difference between the two signals the overrun displacement is found. In a manner dependent on such overrun displacement the adjustment value is formed or derived and stored in the measured data memory of the control means 26 for setting the safety distance. The safety distance must be at least equal to the overrun displacement, and preferably should be however only slightly larger. In the simplest case may be formed by linking the overrun displacement with a certain multiplication factor.

In accordance with a further design of the invention the stored adjustment value is checked or examined cyclically or in the case of certain events. The data memory is designed in the form of a non-volatile memory so that the adjustment value remains in it even following an interruption in the electrical power supply. If now in the case of a renewed measurement of the overrun displacement it is found by comparison that the new overrun displacement substantially departs from the previously determined one, and is for instance larger than it, then in a manner dependent on the new overrun displacement found a new adjustment value is set in a suitable manner, which will now replace the adjustment value stored so far. The closing movement of the top tool 10 or the working movement of the machine generally is then barred until a new adjustment process or operation has taken place automatically, which process sets a new safety distance in accordance with the new adjustment value.

In order to ensure that an interruption of the laser beam 23 by the workpiece to be worked, for instance by the sheet metal, does not result in halting movement of the top tool 10, something which would certainly be undesired, a switching off means, not illustrated, is provided by which the operation of the photoelectric detectors 20 through 22 is turned off, when a certain distance from the workpiece or from the bottom tool 11 is reached, which is essentially equal to the safety distance. This turning off means may for instance be controlled by a position sensor, a distance measuring element or the like.

FIG. 2 shows a case in which a finger 25 of an operator (not illustrated) is moved from the side over the bottom tool 11 into the groove or trough 13, while the sheet metal 14 to be worked is withdrawn at this position or has an opening. In this case a single photoelectric detector 20 placed near the working edge of the top tool 10 would not be able to prevent injury. For this reason in the embodiment of the invention a plurality of photoelectric detectors 20 through 22 are provided alongside each other in one plane.

The above described guard means is naturally not limited to pressbrakes and guillotines and may be employed in all situations, where two machine parts perform working movements toward each other, so that any body part between them might be injured. Furthermore the switching off circuit for safety reasons will naturally protect the machine or machine parts, if objects should get in the way of the movement in manner likely to damage such machine parts or tools.

The guard means in accordance with the invention may for example also be employed also on stamping machines, hinged doors, hatch covers, planing machines, sliding doors or the like.

What is claimed is:

1. A guard means for machines in the case of which a first machine part performs working movements toward a second machine part, comprising at least one photoelectric detector whose light beam extends perpendicularly to the direction of working movement and which is able to be so positioned between the two machine parts on one thereof that its light beam is at a safety distance from such machine part, such safety distance being able to be set by means of a guard means arranged adjustably on this one machine part, such guard means bearing the at least one photoelectric detector, a halting means adapted to arrest the working movement on interruption of the light beam and a switching off means for switching off the halting means directly prior to interruption of the light beam, further comprising means for the performance of a first movement of the guard means as far as interruption of the light beam by the machine part bearing the guard means and the performance of a second movement of the guard means in the opposite direction, the displacement or distance traveled, which sets the safety distance, in the second movement being able to be predetermined by an electrical measuring and/or control means.

2. The guard means as set forth in claim 1, wherein the control means comprises a data memory or an adjustment value memory for the storage of an overrun displacement predetermining the safety distance.

3. The guard means as set forth in claim 2, comprising means for the automatic detection of the overrun displacement of the moving machine part following an arrest signal, a value dependent on such overrun displacement predetermining the safety distance in the data memory.

4. The guard means as set forth in claim 3, comprising a comparison means for the comparison of the stored overrun displacement with a newly found overrun displacement and means for the renewed automatic setting of the safety distance in a manner dependent on the new overrun displacement, when a predetermined departure between the earlier and the new overrun displacement is found.

5. The guard means as set forth in claim 3, wherein the means for the automatic detection of the overrun displacement during the first closing movement of the machine starts after interruption of the electrical power supply or following a predetermined number of cycles.

6. The guard means as set forth in claim 1, comprising a plurality of such electrical control switches or wireless control element, which are functionally connected with the moving guard means and further comprising means for preventing closing movement of the machine parts prior to reaching a preselected control switch or control element.

7. The guard means as set forth in claim 1, comprising a motor drive device for performance, manually initiated or completely automatic, of the movement of the guard means.

8. The guard means as set forth in claim 1, wherein the electrical measuring and/or control means comprises means for initiating setting of the overrun displacement during the second movement only when the interruption of the light beam has taken place.

9. The guard means as set forth in claim 1, wherein at least two photoelectric detectors are positioned in two planes arranged one after the other in the direction of working movement, the photoelectric detector provided for adjustment of the safety distance being arranged in the plane nearer to the machine part bearing it.

10. The guard means as set forth in claim 1, wherein the machines are pressbrakes, guillotines, or stamping machines.

11. The guard means as set forth in claim 1, wherein said at least one photoelectric detector comprises a laser photoelectric detector.

* * * * *